(12) United States Patent
Hu et al.

(10) Patent No.: US 9,261,260 B2
(45) Date of Patent: Feb. 16, 2016

(54) LENS UNIT AND LED MODULE USING THE SAME

(71) Applicant: HON HAI PRECISION INDUSTRY CO., LTD., New Taipei (TW)

(72) Inventors: Chau-Jin Hu, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 174 days.

(21) Appl. No.: 14/053,579

(22) Filed: Oct. 14, 2013

(65) Prior Publication Data

US 2015/0078006 A1 Mar. 19, 2015

(30) Foreign Application Priority Data

Sep. 18, 2013 (TW) .............................. 102134007 A

(51) Int. Cl.
| | |
|---|---|
| *F21V 13/04* | (2006.01) |
| *F21V 5/04* | (2006.01) |
| *F21V 14/04* | (2006.01) |
| *G02B 19/00* | (2006.01) |
| *F21Y 101/02* | (2006.01) |

(52) U.S. Cl.
CPC . *F21V 13/04* (2013.01); *F21V 5/04* (2013.01); *F21V 14/04* (2013.01); *G02B 19/0028* (2013.01); *G02B 19/0061* (2013.01); *F21Y 2101/02* (2013.01)

(58) Field of Classification Search
CPC ......... H01L 33/60; F21V 5/046; F21V 13/04; F21V 13/14; F21V 17/08; F21V 19/002; F21V 19/0035; F21V 37/0075; F21V 7/0025; F21V 7/04; F21V 17/00; F21K 9/50; F21K 9/58; F21S 8/02; F21S 8/06; F21S 48/1113; F21S 48/1768

USPC ........... 362/296.01, 299, 300, 302, 303, 305, 362/306, 311.01, 311.02, 325, 358, 245, 362/249.02, 328; 359/726–736, 364

See application file for complete search history.

(56) References Cited

U.S. PATENT DOCUMENTS

| 4,978,948 | A | * | 12/1990 | Samen ......................... 340/690 |
|---|---|---|---|---|
| 2007/0019416 | A1 | * | 1/2007 | Han et al. ...................... 362/307 |
| 2008/0067531 | A1 | * | 3/2008 | Chang ............................ 257/98 |
| 2008/0073663 | A1 | * | 3/2008 | Chang ............................ 257/99 |
| 2009/0059597 | A1 | * | 3/2009 | Chuang ........................ 362/296 |
| 2011/0089453 | A1 | * | 4/2011 | Min ................................ 257/98 |
| 2013/0107520 | A1 | * | 5/2013 | O'Kane ........................ 362/235 |
| 2015/0001562 | A1 | * | 1/2015 | Han et al. ........................ 257/98 |
| 2015/0023049 | A1 | * | 1/2015 | Ellis ............................ 362/554 |
| 2015/0098226 | A1 | * | 4/2015 | Chen ............................ 362/299 |

FOREIGN PATENT DOCUMENTS

WO WO 2013081417 A1 * 6/2013

* cited by examiner

*Primary Examiner* — Evan Dzierzynski
*Assistant Examiner* — Christopher E Dunay
(74) *Attorney, Agent, or Firm* — Novak Druce Connolly Bove + Quigg LLP

(57) ABSTRACT

A lens unit includes a lens and a reflector hung to the lens. The lens includes a bottom face, a light incident face formed in the bottom face, a light emerging face opposite to the bottom face and a lateral face connecting the bottom face with the light emerging face. A wire extends through the light incident face and the light emerging face. A top end of the wire is attached on a block disposed on the light emerging face, a bottom end of the wire is attached to the reflector. An LED module incorporating the lens unit is also disclosed.

20 Claims, 4 Drawing Sheets

LENS UNIT AND LED MODULE USING THE SAME

BACKGROUND

1. Technical Field

The disclosure generally relates to lens units and LED (light emitting diode) modules, and more particularly to a lens unit having a movable reflector, and an LED module incorporating the lens unit.

2. Description of Related Art

Nowadays LEDs (light emitting diodes) are applied widely in various applications for illumination. The LED is a highly pointed light source. Thus, light directly emitted from the LED may form a small light spot. However, the small light spot can only illuminate a small area. In order to achieve a large illumination area, a large number of LEDs are required to be incorporated together, thereby resulting in a high cost.

Therefore, a lens is used with the LED to modulate the light distribution of the LED. The lens can diverge the light emitted from the LED to thereby illuminate a large area. However, the light modulation capability of the lens is fixed once the lens is designed and manufactured. Thus, if different light distribution of the LED is required, the lens is required to be redesigned and manufactured, resulting in a high cost of illumination.

What is needed, therefore, is a lens unit and an LED module using the lens unit which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
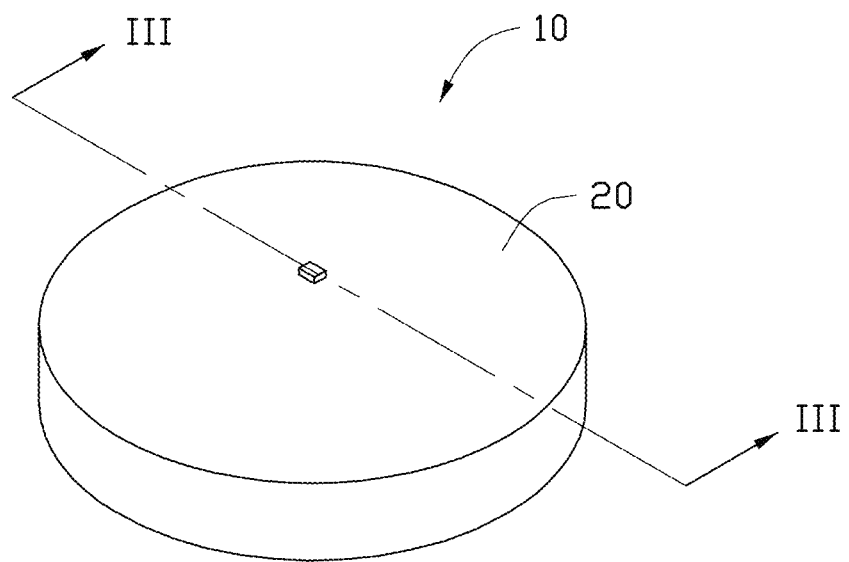
FIG. 1 is an isometric view of an LED module in accordance with an embodiment of the present disclosure.
Figure 2:
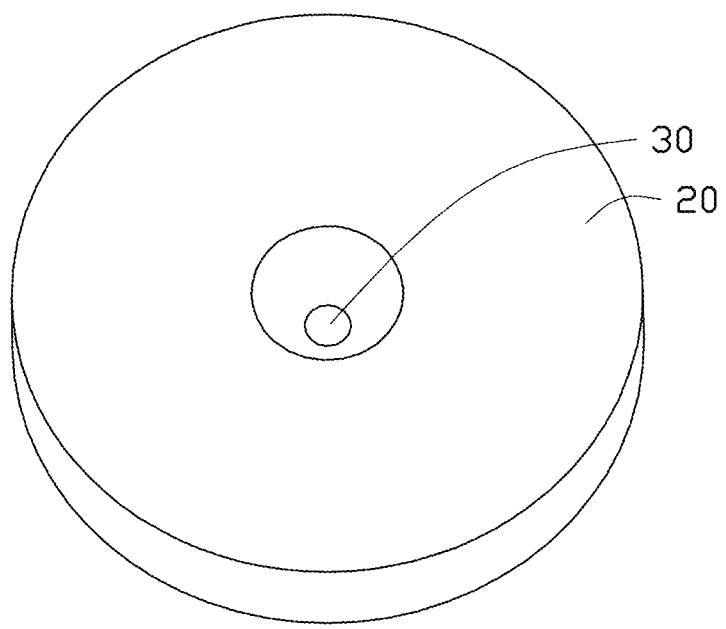
FIG. 2 is an inverted view of the LED module of FIG. 1, wherein an LED of the LED module is removed for clarity.
Figure 3:
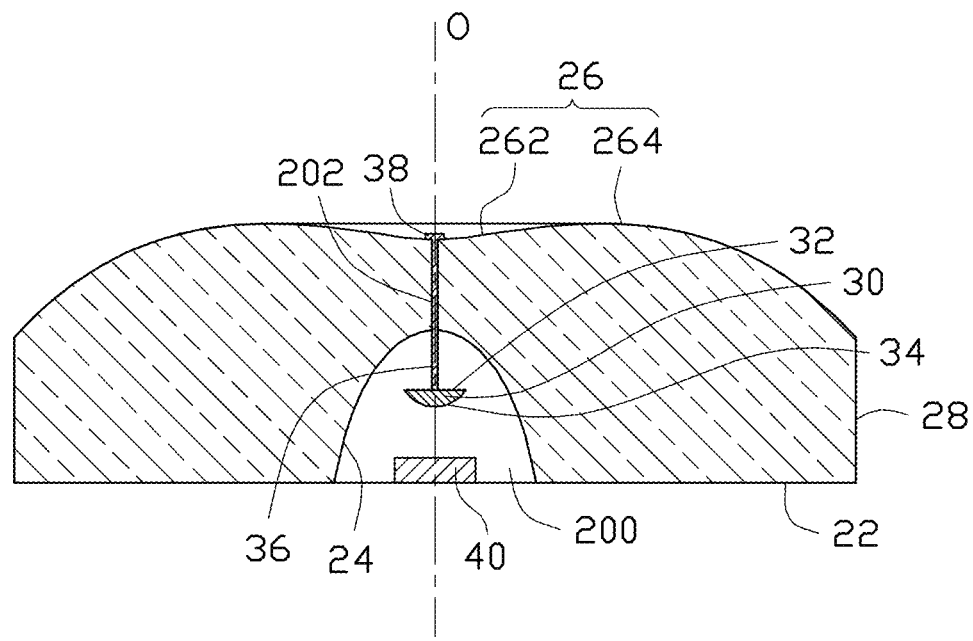
FIG. 3 is a cross section of the LED module of FIG. 1.

Referring to FIGS. 1-3, an LED (light emitting diode) module 10 in accordance with an embodiment of the present disclosure is shown. The LED module 10 includes an LED 40, a lens 20 covering the LED 40 and a reflector 30 movably connected to the lens 20.

The lens 20 may be made of transparent material such as epoxy, silicone, glass or the like. The lens 20 includes a bottom face 22, a light incident face 24 formed in the bottom face 22, a light emerging face 26 opposite to the bottom face 22 and a lateral face 28 connecting the bottom face 22 and the light emerging face 26.

The bottom face 22 is a flat and circular face. The light incident face 24 is defined in a central area of the bottom face 22 and encloses a cavity 200 to receive the LED 40. The cavity 200 has a diameter gradually decreasing from the bottom face 22 towards the light emerging face 26. The light incident face 24 is an elliptical face with a long axis perpendicular to the bottom face 22, and a short axis parallel to and located within the bottom face 22.

The LED 40 is received in the cavity 200. The LED 40 may be made of semiconductor material such as GaN, InGaN, AlInGaN or the like. The LED 40 can emit visible light when being powered. In this embodiment, the LED 40 is a white LED 40. The light emitted from the LED 40 passes through the cavity 200 and enters the lens 20 via the light incident face 24.

The light emerging face 26 is located above the bottom face 22. The light emerging face 26 includes a concave face 262 and a convex face 264 surrounding the concave face 262. The concave face 262 is located at a central area of the light emerging face 26 and opposite to the light incident face 24. The concave face 262 has a curvature less than that of the light incident face 24. The convex face 264 connects the concave face 262 with the lateral face 28. In this embodiment, a junction between the concave face 262 and the convex face 264 is smooth and curved, and a junction between the lateral face 28 and the convex face 264 is abrupt. The convex face 264 has a bottom lower than a top of the light incident face 24. The light emerging face 26 can diverge the light from the light incident face 24 out of the lens 20, thereby illuminating a large area.

The lateral face 28 directly connects the convex face 264 with the bottom face 22. The lateral face 28 is an annular face perpendicular to the bottom face 22. The lateral face 28 may be further coated with a reflective layer for reflecting the light from the light incident face 24 towards the light emerging face 26.

Figure 4:
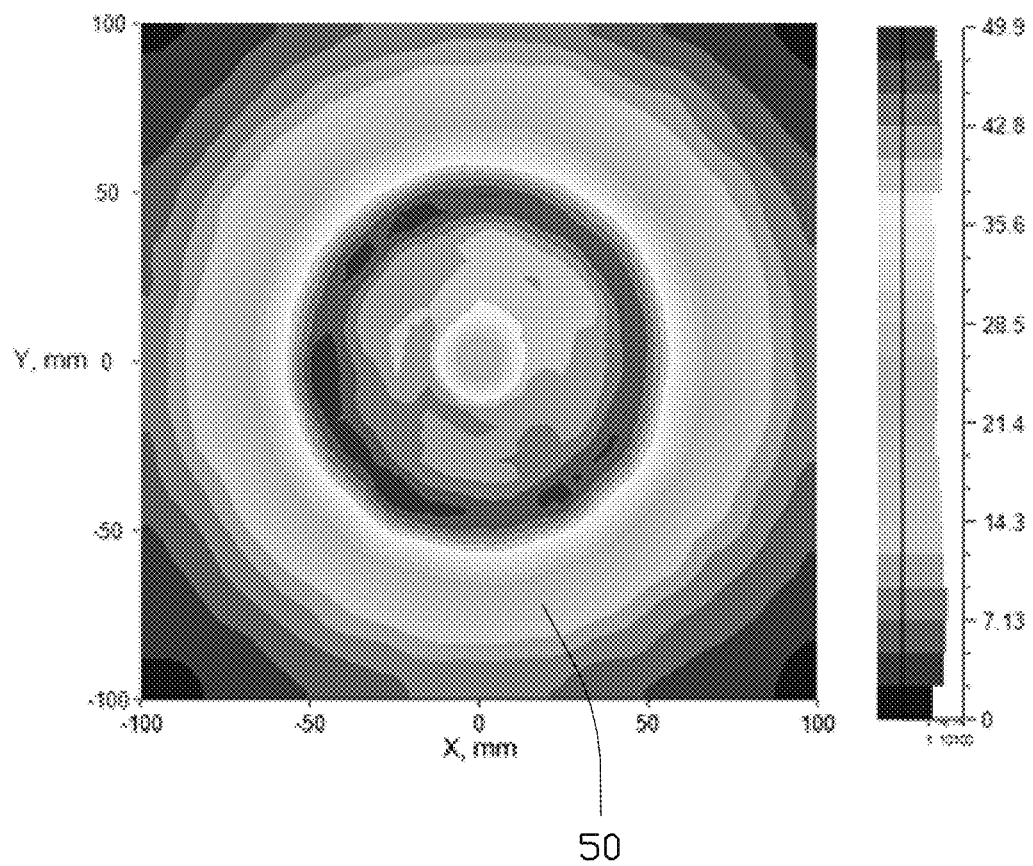
FIG. 4 shows a light distribution of the LED module of FIG. 1.

Also referring to FIG. 4, a slot 202 is defined in the lens 20. The slot 202 extends from the concave face 262 to the light incident face 24. The slot 202 communicates with the cavity 200. The slot 202 is aligned with a central axis O of the lens 20 and perpendicular to the bottom face 22. A wire 36 extends through the slot 202 to hang the reflector 30 within the cavity 200. In this embodiment, the wire 36 is rigid so that the reflector 30 can be stably hung in the lens 20 without being swayed. Preferably, the wire 36 may be made of metal such as copper or aluminum. The reflector 30 is fixed on a bottom of the wire 36 to be hung between the light incident face 24 and the LED 40. The reflector 30 includes a connecting face 32 and a reflective face 34 opposite to the connecting face 32. The connecting face 32 is flat and directly connects the bottom of the wire 36. The reflective face 34 is curved and protrudes towards the LED 40. The reflective face 34 can reflect the light from the LED 40 having a small light emerging angle (i.e., the light having a small angle deviated from the central axis O of the lens 20) towards the lateral face 28, thereby reducing intensity of a center of a light distribution 50 of the LED module 10. A block 38 is formed on a top end of the wire 36. The block 38 has a width larger than a diameter of the slot 202 so that the block 38 will not be dropped into the slot 202. The block 38 abuts against the concave face 262 to hang the reflector 30 in the cavity 200.

A height of the reflector 30 can be adjusted by coiling or releasing the wire 36 on or from the block 38. Therefore, less or more light emitted from the LED 40 will be reflected by the reflector 30, thereby changing the light distribution 50 of the LED module 10. Furthermore, the reflector 30 can be replaced by another reflector by separating the wire 36 from the block 38 to remove the reflector 30, and then attaching another wire with the another reflector on the block 38. Thus, the light distribution 50 of the LED module 10 can be varied more favorably.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens unit comprising:
   a lens; and
   a reflector; and
   a wire hanging the reflector to the lens;
   a light incident face and a light emerging face opposite to the light incident face;
   a bottom face opposite to the light emerging face;
   the light emerging face comprising a concave face and a convex face surrounding the concave face; and
   a lateral face directly connecting the convex face and the bottom face, and the light incident face being an elliptical face and spaced form the lateral face and the emerging face.

2. The lens unit of claim 1, wherein a slot extending from the light incident face to the light emerging face.

3. The lens unit of claim 2, wherein the wire extends through the slot.

4. The lens unit of claim 1, wherein the wire is rigid.

5. The lens unit of claim 1 further comprising a block abutting against the light emerging face, wherein an end of the wire connects the block, and an opposite end of the wire connects the reflector.

6. The lens unit of claim 5, wherein the block abutting against the concave face.

7. The lens unit of claim 1, wherein the light incident face encloses a cavity in the lens, the reflector being hung in the cavity.

8. The lens unit of claim 1, wherein the light incident face being defined in a central area of the bottom face.

9. The lens unit of claim 8, wherein the lateral face being perpendicular to the bottom face.

10. The lens unit of claim 1, wherein the reflector comprises a flat face directly connecting the wire and a curved face opposite to the flat face, the curved face protruding in a direction away from the flat face.

11. An LED (light emitting diode) module comprising:
    an LED;
    a lens covering the LED, the lens comprising a light incident face and a light emerging face opposite to the light incident face;
    a reflector hung between the LED and the light incident face of the lens by a wire;
    the light emerging face comprising g a concave face and a convex face surrounding the concave face;
    a bottom face opposite to the light emerging face; and
    a lateral face directly connecting the convex face and the bottom face, the light incident face being an elliptical face and spaced form the lateral face and the emerging face.

12. The LED module of claim 11, wherein the light incident face encloses a cavity in the lens, the reflector being received in the cavity.

13. The LED module of claim 11, wherein the wire extends through the light incident face and the light emerging face.

14. The LED module of claim 11, wherein the wire has a block attached to a top end thereof, the reflector being attached to a bottom end of the wire.

15. The LED module of claim 14, wherein the block abutting against the concave face.

16. The LED module of claim 11, wherein the wire is rigid.

17. The LED module of claim 11, wherein the wire being perpendicular to the bottom face.

18. The LED module of claim 11, wherein the lateral face being perpendicular to the bottom face.

19. The LED module of claim 11, wherein the concave face has a curvature less than that of the light incident face.

20. The LED module of claim 11, wherein the light incident face is recessed from the bottom surface inwards for receiving the lens and the reflector, the light incident face is an elliptical face and has an apex, and the wire penetrates from the apex through the lens.

\* \* \* \* \*